United States Patent [19]

Bolender et al.

[11] 4,233,011

[45] Nov. 11, 1980

[54] ROLLS OF CONTROLLABLE FLEXURE, ESPECIALLY FOR MACHINES FOR THE PRODUCTION AND PROCESSING OF WEBS OF PAPER OR PLASTIC

[75] Inventors: Walter Bolender, Erkrath; Ernst Wallner, Langenfeld, both of Fed. Rep. of Germany

[73] Assignee: ER-WE-PA Maschinenfabrik & Eisengiesserei, Ekrath, Fed. Rep. of Germany

[21] Appl. No.: 69,660

[22] Filed: Aug. 24, 1979

[30] Foreign Application Priority Data

Aug. 31, 1978 [DE] Fed. Rep. of Germany ....... 2837913

[51] Int. Cl.$^2$ ............ B30B 15/14; B30B 3/04; B29D 7/14
[52] U.S. Cl. .................... 425/143; 425/363; 425/367; 425/368; 29/116 AD; 165/26
[58] Field of Search ............ 425/143, 363, 367, 368, 425/373; 29/116AD; 165/26

[56] References Cited

U.S. PATENT DOCUMENTS

| | | | |
|---|---|---|---|
| 2,912,556 | 11/1959 | Hold | 165/26 |
| 3,074,695 | 1/1963 | Hold et al. | 425/143 X |
| 3,313,002 | 4/1967 | Wyeth | 425/363 X |
| 3,328,866 | 7/1967 | Robertson | 29/116 AD |
| 3,339,228 | 9/1967 | Seanor et al. | 425/143 X |
| 3,972,671 | 8/1976 | Aspin | 425/363 |
| 4,000,242 | 12/1976 | Hartbauer | 425/368 X |
| 4,030,177 | 6/1977 | Hold | 29/116 AD |
| 4,074,624 | 2/1978 | Burnstad et al. | 29/116 AD X |
| 4,124,349 | 11/1978 | Lehmann | 425/367 |

FOREIGN PATENT DOCUMENTS 1343136 10/1963 France.
352988 5/1961 Switzerland.

Primary Examiner—Howard J. Flint, Jr.
Attorney, Agent, or Firm—Sprung, Felfe, Horn, Lynch & Kramer

[57] ABSTRACT

A roll of controllable flexure having a cylindrical inner part and a tubular outer part surrounding the inner part and mounted rotatably at both its ends on the inner part. A heating strip is disposed along a generatrix on the inner part. At least one electrical temperature sensor is disposed in the inner part in the immediate vicinity of the heating strip and at least one additional electrical temperature sensor is disposed on the opposite side of the inner part. The two temperature sensors are connected to a temperature difference measuring apparatus and control an electrical regulating circuit to which a power circuit containing the heating strip is connected. The power delivered to the heating strip is so regulated that a preset temperature difference between the heated and unheated sides of the inner part is maintained. The different thermal elongation of the unheated and heated sides of the inner part produces an arching of the inner part which is transmitted to the outer part. The side of the inner part that faces away from the heating strip can be cooled.

11 Claims, 3 Drawing Figures

ROLLS OF CONTROLLABLE FLEXURE, ESPECIALLY FOR MACHINES FOR THE PRODUCTION AND PROCESSING OF WEBS OF PAPER OR PLASTIC

BACKGROUND OF THE INVENTION

The invention relates to a roll of controllable flexure, especially for machines for the production and processing of webs of paper or plastic.

Webs of paper or plastic are frequently pressed between two or more rolls in the course of their production or processing. In general, a uniform distribution of the pressure in the nips between the rolls is required during such pressing. However, inasmuch as the rolls undergo a perceptible sag due to their own weight and the high contact pressure, especially when the working width is very wide, the pressure at the ends of the rolls is greater than in the center. This leads to undesired effects in the manufacture and processing of the webs.

Rolls of controllable flexure are basically known. They generally have a substantially cylindrical internal part and a tubular outer part which extends over a portion of the length of the internal part, surrounding the latter, and is mounted on the inner part at both of its extremities for rotation about the cylinder axis. Devices are generally disposed between the inner part and the outer part for the production of compulsive forces acting radially between the inner part and the outer part.

Thus, in a known roll of controllable flexure the outer part is floatingly mounted on the inner part, the space between the outer and inner parts being divided into two chambers extending longitudinally, which contain a hydraulic fluid which in one of the two chambers is placed under elevated pressure. This elevated pressure is intended to produce an upward arching in the middle of the roll to compensate the sag produced by the roll's own weight. This known roll, however, is expensive to make on account of the fluid feed lines and the sealing problems, and the control of its sag is relatively poor.

In another known roll of controllable flexure, which likewise operates on the hydraulic principle, a plurality of supporting elements are disposed along a generatrix on the inner part upon which the outer part is directly supported on a film of lubricant. The supporting means can be forced radially outward by hydraulic pressure and thereby can produce the desired additional compulsive forces between the inner part and the outer part. This known roll is very expensive to make, because each individual source of support must be connected by high-pressure lines to the hydraulic circuit. Considerable sealing problems result, as well as difficulties in the assembly and maintenance of the roll.

SUMMARY OF THE INVENTION

The object of the invention is to create a roll of controllable flexure which is of simple design, is easy to assemble, is subject to minimum wear in operation, and is easy to service.

The invention sets out from the fundamental knowledge that a flexing of an elongated structural member can be obtained by heating one side of the member while maintaining the temperature of its opposite side constant. The flexing of the member will then be produced by the unilateral longitudinal thermal expansion.

The invention sets out from a roll having a substantially cylindrical inner part and a tubular outer part which extends over a portion of the length of the inner part, surrounding the latter and mounted at both of its ends on the inner part for rotation about the cylinder axis, in which a system for the production of compulsive forces acting radially between the inner part and the outer part is disposed along a generatrix on the inner part. The solution of the problem set forth above is accomplished in accordance with the invention by the fact that a heating strip composed of one or more sections which can be connected to an electrical heating circuit is disposed on the inner part and extends at least over a portion of the length of the inner part and over a given portion of the circumference thereof that is smaller than 180°, and that in the inner part there are disposed at least two electrical temperature sensors, of which at least one first temperature sensor is directly adjacent the heating band or section thereof and at least one second temperature sensor is on the diametrically opposite side of the inner part, and that the first and second temperature sensors are connected in pairs to an apparatus for measuring the temperature difference, and at least one electrical regulating circuit is provided to which the apparatus for measuring the temperature difference or differences and the heating power circuit or circuits are connected, and which regulates the heating of the heating strip or sections thereof such that a given temperature difference or given temperature differences are maintained between the heated and the unheated side of the inner part.

As it will be further explained hereinbelow in conjunction with an embodiment, the unilateral heating of the inner part brings about a flexing of the inner part which due to the mounting of the outer part on the inner part is transmitted to the outer part. It is thus possible not only to compensate the natural sag of the roll so as to maintain a uniform nip pressure, but it is also possible for certain purposes to achieve an additional flexure of the roll surface in particular areas.

The roll can be designed very simply, since the departure from the hydraulic principle eliminates sealing problems.

Advantageous embodiments of the subject matter of the invention are set forth hereinafter.

For example, it is advantageous to provide for forced cooling of the unheated side of the inner part, and it can be brought about by the measures described such that there will be a constant, controllable temperature difference between the two opposite sides of the inner part.

Of especial importance is the embodiment specified herein, wherein it is possible to provide a different temperature difference in each of the heated zones, thereby producing a sinuous profile on the roll surface for certain purposes. Due to the independent controlling of the roll profile in different areas on the basis of the different heating zones it is especially easily possible to use the roll of the invention for the adjustment of the moisture content of a paper web immediately after it is produced on the paper machine. For this purpose the moisture content of the paper web is measured at various points on its width, and the measured values are fed to the electrical regulating circuit controlling the flexure of the roll. If the moisture content in a particular area of the paper web exceeds a given level, a stronger flexure against the web is produced in the heating zone of the roll corresponding to this area by producing a greater temperature difference between the upper and lower sides of the inner part, thereby increasing the nip pressure in this zone and enabling the moisture content at this point to be balanced out. In this embodiment, therefore, it is possible to have variable contact pressure in addition to the correction of the transverse profile of the roll.

If the roll of the invention is used on paper machines, a considerable increase of production and an improvement of the quality of paper can be achieved with very little trouble.

An additional important possibility for the use of the roll of the invention is an apparatus for the production of plastic films in accordance with the teachings herein.

BRIEF DESCRIPTION OF THE DRAWINGS

Embodiments of the roll of the invention will be further explained with the aid of the appended drawings, wherein.

DETAILED DESCRIPTION OF THE INVENTION

Figure 1:
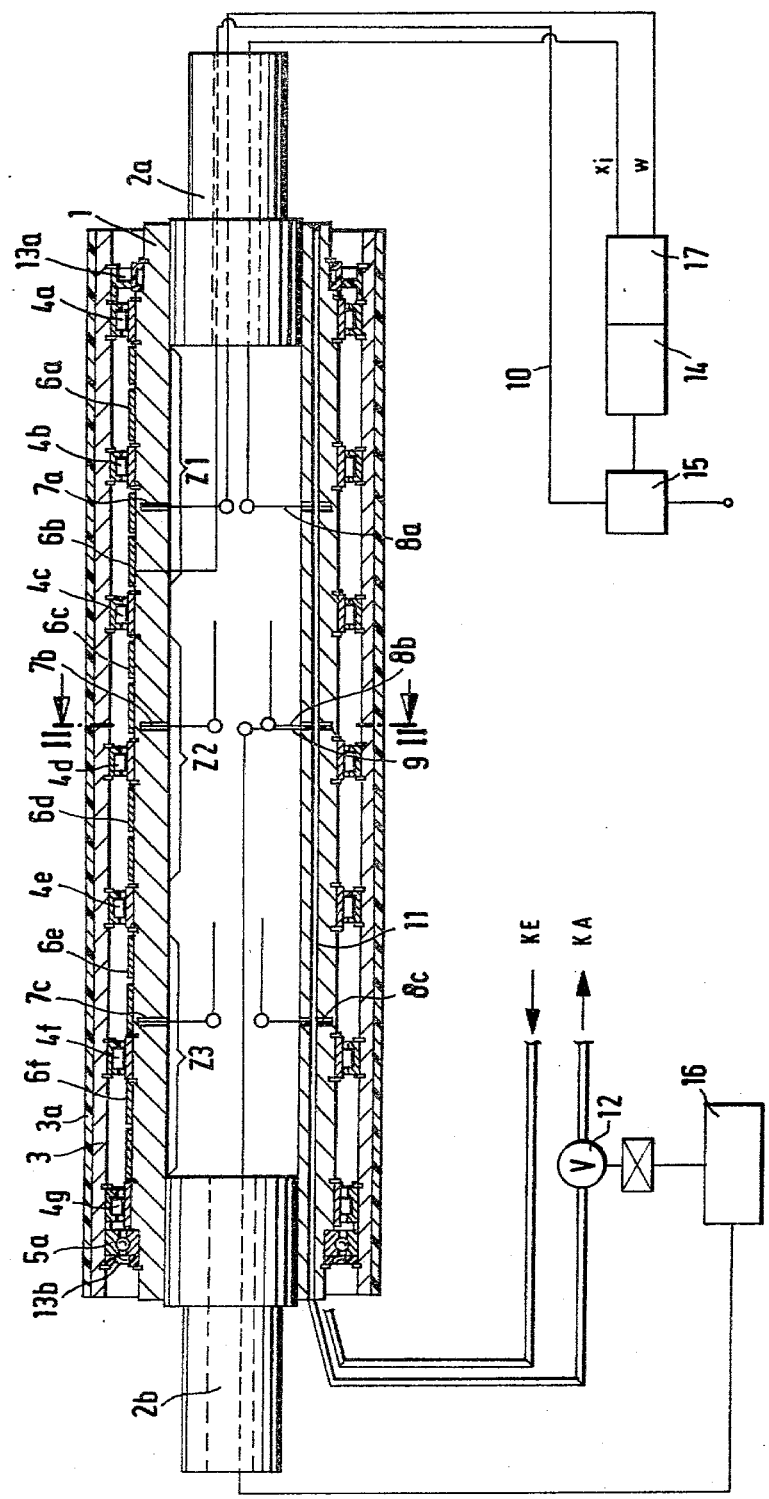
FIG. 1 is a diagrammatic longitudinal cross section of an embodiment of a roll of controllable flexure.
Figure 2:
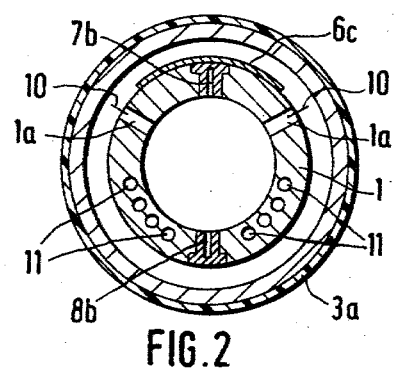
FIG. 2 is a cross-sectional view taken through the roll of FIG. 1, along the line II—II.

The roll of controllable flexure represented in FIGS. 1 and 2 has a tubular inner part 1 having the journals 2a and 2b at its extremities. The tubular outer part 3 is supported on the inner part 1 by a total of seven roller bearings 4a to 4g, and a separate jacket 3a can be provided on its outer surface.

The roller bearings 4a to 4g are self-aligning roller bearings. They are arranged such that the distance between each of the two roller bearings 4a and 4g disposed at the ends and its adjacent roller bearing 4b and 4f, respectively, is slightly greater than the distances of roller bearings 4b, 4c, 4d, 4e and 4f from one another, which are equal. It has been found that this spacing of the roller bearings bring about an especially uniform distribution of the forces along the roll. At one of the two ends, the outer part 3 is held axially against the inner part 1 by an axial thrust bearing 5a in the form of a ball bearing.

On the upper side, in the figures, of the inner part 1, heating strip sections 6a to 6f are disposed longitudinally between adjacent pairs of the roller bearings 4a to 4g. As seen in FIG. 2, these heating strip sections have a width corresponding to approximately 90° of the circumference of the inner part. The heating strip sections are each connected to electrical heating power circuits 15 by conductors 10, of which only one is represented for the sake of simplicity. Each such power circuit 15 is associated with two of the heating strip sections. Thus, the heating strip sections 6a and 6b create a heating zone Z1, heating strips 6c and 6d a heating zone Z2 and heating strips 6e and 6f a heating zone Z3. The electrical conductors of the power circuits are carried within the inner part 1 and emerge through bores 1a.

In the lower half, in FIGS. 1 and 2, of the inner part 1 there are provided cooling passages 11 which are connected together in pairs in series and are connected to a coolant supply line KE and a coolant discharge line KA.

In addition, bores are disposed in the inner part 1 at the inner side adjacent the heating strips 6a to 6f, and temperature sensors 7a to 7c are situated therein. Each of the temperature sensors 7a to 7c is associated with one of the heating zones Z1 to Z3. Also, bores are disposed on the inner side of the lower half of the inner part 1, and temperature sensors 8a to 8c are situated in them. The temperature sensors 7a and 8a are connected together to an apparatus 17 for determining temperature differences, which in turn is connected to a regulator 14 which in turn controls one of the heating circuits 15. In like manner the temperature sensors 7b and 8b and 7c and 8c are connected with unrepresented apparatus for measuring temperature difference, the heating power circuits of the heating strips associated with the heating zones Z2 and Z3 being controlled by means of corresponding regulators. Lastly, in the inner part 1 there is still another temperature sensor 9 which is connected to an additional regulator 16. Regulator 16 controls a valve 12 in the coolant circuit of the roll.

Finally, labyrinth packings 13a and 13b are disposed at both ends of the roll between the outside part 13 and the inside part 1, so as to prevent any unwanted influence by convection between the outside air and the air in the space between the outside part 3 and the inside part 1.

In operation, the roll represented in FIGS. 1 and 2 is held fixedly at the journals 2a and 2b, so that the outer part 3 is rotatable about the stationary inside part 1. The roll can, for example, be mounted in the position represented in FIGS. 1 and 2 on a paper machine, so that the heating strips are on the top of the inside part while the bottom of the inside part is cooled. The weight of the roll causes it at first to sag. In the case of a concrete example of a roll for a web width of 3600 mm designed for a nip pressure of 117.7 N/mm, the sag in the center of the roll amounts to approximately 1.6 millimeters. To achieve a uniform nip pressure, this sag has to be compensated. A certain temperature difference between the temperature sensors 7a and 7a, 7b and 8b, 7c and 8c, is preset in the regulators 14. Through the power circuits 15 the heating strips 6a to 6f are heated until the preset temperature differences are reached. The necessary temperature differences must be determined in advance by appropriate experiment or calculation. The unilateral heating of the inner part 1, causes it to arch on the side that is heated, and this arching is transmitted through the roller bearings 4a to 4g to the outside part 3. By this arching the sag is compensated, and it has been found that, in the case of the sag cited above, a temperature difference of 33.6° C. between the top side and the bottom side of the inner part is necessary in order to compensate the natural sag and assure a uniform contact pressure for the roll. If the temperature difference is greater, the top side of the roll will arch to a still greater degree.

In the aforementioned example the dimensions of the inner part 1 are 3,650 mm in length a thickness in the central portion of 80 mm and an outer diameter of 420 mm. The outer part 3 has a length of 3,600 mm, a thickness of 40 mm and an outer diameter of 600 mm. The inner part 1 is composed of steel and the outer part 3 is composed of steel.

In accordance with the present invention, the inner part can have a length from about 1,650 to 10,000 mm, a thickness from about 60 to 200 mm with the outer diameter from about 220 to 1,000 mm. Accordingly the outer part can have a length from about 1,600 to 9,900 mm, a thickness from about 40 to 90 mm, with the outer diameter from about 350 to 1,400 mm. Another suitable material for the outer part is mechanite. The jacket 3a is preferably composed of rubber, stonite or polyurethane and may have a thickness in the range of about 15 to 25 mm. The nip pressure can have a value from about 14.715 to 196.2 N/mm.

The adjusted roll profile is maintained as long as the preset temperature difference is not changed. The temperature point of reference is the temperature measured by the temperature sensor 9 at the bottom side of the inner part 1. If, due to thermal conduction through the inner part 1, the temperature at the bottom side changes, the supply of cooling water will be modified by the regulator 16 and the valve 12 until a preset temperature is reestablished at this point as well.

The roll of controllable flexure represented in FIGS. 1 and 2 can also, however, be operated by presetting different temperature differences for each of the heating zones Z1, Z2 and Z3. On account of the different degrees of arching which are then produced, a particular desired configuration of the outer roll surface can be achieved.

The control of the arching or curvature in the various zones Z1, Z2 and Z3 can, as previously mentioned, is used in a paper machine for the purpose of varying the roll contact pressure in different portions of the roll of controllable flexure serving as the press roll, in relation to the moisture content measured in particular areas of the paper web.

For this purpose the regulator 14 need only be expanded so that the temperature difference to be preset in it will be variable by means of an accessory device on the basis of a predetermined moisture content. The actual moisture content of the paper web, indicated by a moisture meter, is then compared in each case with the preset value and the contour of the roll is corrected through the regulator 14 such that, if the moisture content is too high, the contact pressure in the involved area will be increased.

Figure 3:
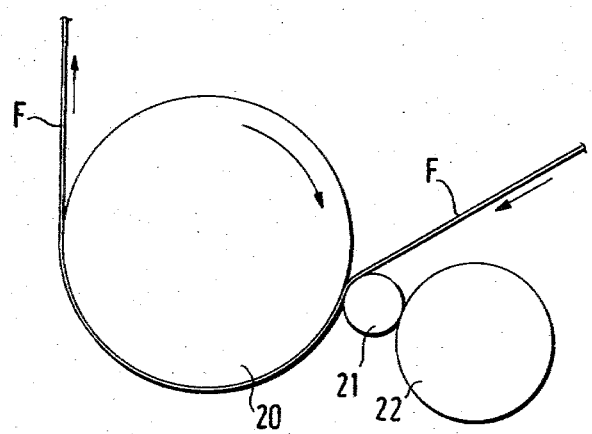
FIG. 3 is a highly diagrammatic representation of an embodiment of the roll of the invention in use in an apparatus for the production of plastic films.

In FIG. 3 there is shown an additional possibility for the use of the roll of controllable flexure of the invention.

In apparatus for the production of plastic films, commonly known as film casting machines, the plastic film is fed to a cooling cylinder against which it is pressed by a press roll. Here the diameter of the press roll must be substantially smaller than the diameter of the cooling cylinder for the purpose of keeping the nip width as narrow as possible. Due to the small diameter of the press roll, however, the amount of sag due to its own weight is particularly great, especially in the case of great web width. For this reason, in known apparatus a supporting roll of larger diameter is disposed parallel to the longitudinal axis of the press roll. The sag of the press roll, however, can be compensated only in part by this supporting roll, since the supporting roll itself also has a sag due to its own weight.

In FIG. 3, the cooling cylinder 20 of an otherwise not indicated apparatus for the production of plastic films is represented diagrammatically. The plastic film F is pressed against the cooling cylinder 20 by means of the press roll 21. Parallel to the longitudinal axis of the press roll 21 there is disposed a supporting roll 22. This supporting roll 22 is a roll of controllable flexure in an embodiment, for example, such as the one described in conjunction with FIGS. 1 and 2. As a result of the precise control of the arching of the supporting roll 22, the sag of the press roll 21 can also be completely compensated.

It will be understood that the specification and examples are illustrative but not limitative of the present invention and that other embodiments within the spirit and scope of the invention will suggest themselves to those skilled in the art.

What is claimed is:

1. A roll having controllable flexure comprising: a substantially cylindrical inner element; a tubular outer member configured to extend over a portion of the length of the inner member and surrounding same; means mounting the outer member on the inner member for rotation about the cylindrical axis of the inner member; and means for producing forces acting radially between the inner member and outer member along a generatrix comprising at least one electrically powered heating element disposed on the inner element and extending over at least a portion of the axial length of the inner element and over a given circumferential area that is smaller than 180° to produce a temperature differential therein and a corresponding flexure in response thereto, at least one means for sensing the temperature difference between the portion of the inner member at said at least one heating element and the portion of the inner member diametrically opposite thereto and means for regulating the temperature differential at a selected value for said at least one heating element to obtain a corresponding degree of flexure of the inner member and thereby the outer member.

2. The roll according to claim 1, wherein the means for sensing the temperature difference comprises at least one pair of temperature sensors, said at least one pair having one sensor disposed in the inner member at the heating element and the outer sensor disposed in the inner member at a diametrically opposed portion thereof and means for measuring the temperature difference recorded between said at least one pair of sensors.

3. The roll of claim 2, further comprising a cooling system disposed in the inner part on the diametrically opposite portion from that on which the heating element is mounted.

4. The roll of claim 3, further comprising an additional electrical temperature sensor disposed in the inner member in the vicinity of the cooling system and a regulating circuit connected thereto for regulating the coolant feed in accordance with a preset temperature.

5. The roll of claim 3, wherein the cooling system comprises at least one cooling passage in the inner part and a coolant circuit connected thereto.

6. The roll of claim 5, comprising a plurality of longitudinally running cooling passages, connected pairwise in series such that a coolant inlet and a coolant outlet are situated at the same end of the roll.

7. The roll of claim 2, wherein the means mounting the outer part on the inner part comprises a plurality of roller bearings and further comprises a heating element disposed between every two roller bearings, every two adjacent heating strips forming one heating zone and connected to a common electrical energy input and associated with one pair of temperature sensors wherein each zone has a common one temperature sensor and a common other temperature sensor, and the regulating means includes means for regulating each heating zone.

8. The roll of claim 7, wherein the mounting means comprises a thrust bearing at one end of the inner member.

9. The roll of claim 8, wherein the mounting means comprises labyrinth packings disposed at the ends of the roll between the outer member and the inner member.

10. The roll of claim 9, wherein at least five roller bearings are provided, two of which are disposed at the two ends and one is disposed in the middle of the roll, the spacing of the two outer roller bearings from the roller bearings next to them being greater than the spacing of the rest of the roller bearings from one another.

11. In an apparatus for the production of plastic films having a rotating cooling cylinder, a press roll whose diameter is smaller than the diameter of the cooling cylinder and a supporting roll disposed parallel to the longitudinal axis of the press roll and contacting the press roll along a generatrix, the improvement wherein the supporting roll comprises the roll of controllable flexure according to claim 1.

* * * * *